(12) United States Patent
Erell

(10) Patent No.: US 8,687,741 B1
(45) Date of Patent: Apr. 1, 2014

(54) SCORING HYPOTHESES IN LTE CELL SEARCH

(75) Inventor: Adoram Erell, Herzliya (IL)

(73) Assignee: Marvell International Ltd., Hamilton (BM)

( * ) Notice: Subject to any disclaimer, the term of this patent is extended or adjusted under 35 U.S.C. 154(b) by 357 days.

(21) Appl. No.: 13/052,075

(22) Filed: Mar. 20, 2011

Related U.S. Application Data

(60) Provisional application No. 61/318,500, filed on Mar. 29, 2010.

(51) Int. Cl.
*H04L 27/06* (2006.01)

(52) U.S. Cl.
USPC .......................................... 375/340; 455/434

(58) Field of Classification Search
USPC ........... 375/340, 343, 354; 455/434; 370/252, 370/350, 503
See application file for complete search history.

(56) References Cited

U.S. PATENT DOCUMENTS

| | | | |
|---|---|---|---|
| 5,231,629 A | 7/1993 | Kotzin et al. | |
| 5,349,567 A | 9/1994 | Reed | |
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 7,941,186 B2 | 5/2011 | Cho et al. | |
| 8,036,286 B2 | 10/2011 | Lee et al. | |
| 8,068,555 B2 | 11/2011 | Jongren et al. | |
| 8,098,750 B2 | 1/2012 | Mueck et al. | |
| 8,179,775 B2 | 5/2012 | Chen et al. | |
| 8,325,844 B2 | 12/2012 | Walton et al. | |
| 2003/0035491 A1 | 2/2003 | Walton et al. | |
| 2005/0141630 A1 | 6/2005 | Catreaux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2006/0014554 A1 | 1/2006 | Gerlach | |
| 2006/0056538 A1 | 3/2006 | Nam et al. | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

Japanese Patent Application # 2011-544111 Office Action dated Mar. 12, 2013.

(Continued)

*Primary Examiner* — Aristocratis Fotakis

(57) ABSTRACT

A method includes receiving first and second synchronization sequences that jointly indicate an identity of at least one base station. Multiple hypotheses are selected, each hypothesis associating a respective first candidate sequence with the first synchronization sequence and a respective second candidate sequence with the second synchronization sequence. Each hypothesis is assigned a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match. The at least one base station is identified based on respective composite scores of the hypotheses.

18 Claims, 2 Drawing Sheets

(56) References Cited

U.S. PATENT DOCUMENTS

| | | |
|---|---|---|
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1* | 10/2007 | Onggosanusi et al. ........ 370/338 |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1* | 2/2008 | Moon et al. .................... 370/342 |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1* | 11/2008 | Akita et al. .................... 370/204 |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1* | 1/2009 | Han et al. ....................... 455/434 |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1* | 10/2009 | Chang et al. ................... 380/287 |
| 2009/0252333 A1* | 10/2009 | Chang et al. ................... 380/287 |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1* | 3/2010 | Swarts et al. .................. 455/502 |
| 2010/0074301 A1 | 3/2010 | Howard et al. |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 | 11/2010 | Lee et al. |
| 2011/0019631 A1 | 1/2011 | Kotecha et al. |
| 2011/0026413 A1* | 2/2011 | Swarts et al. .................. 370/252 |
| 2011/0034175 A1 | 2/2011 | Fong et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0103534 A1* | 5/2011 | Axmon et al. ................. 375/371 |
| 2011/0110403 A1 | 5/2011 | Jongren |
| 2011/0164701 A1 | 7/2011 | Nikopourdeilami et al. |
| 2011/0170435 A1 | 7/2011 | Kim et al. |
| 2011/0188393 A1 | 8/2011 | Mallik et al. |
| 2011/0194594 A1 | 8/2011 | Noh et al. |
| 2011/0194644 A1 | 8/2011 | Liu et al. |
| 2011/0205930 A1 | 8/2011 | Rahman et al. |
| 2011/0235608 A1 | 9/2011 | Koo et al. |
| 2011/0250919 A1 | 10/2011 | Barbieri et al. |
| 2011/0268204 A1 | 11/2011 | Choi et al. |
| 2011/0306341 A1* | 12/2011 | Klein et al. .................... 455/434 |
| 2012/0002568 A1 | 1/2012 | Tiirola et al. |
| 2012/0020433 A1 | 1/2012 | Bhattad et al. |
| 2012/0033592 A1 | 2/2012 | Kim et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1 | 3/2012 | Liu et al. |
| 2012/0087425 A1 | 4/2012 | Gomadam et al. |
| 2012/0087435 A1 | 4/2012 | Gomadam et al. |
| 2012/0134434 A1 | 5/2012 | Chen et al. |
| 2012/0219042 A1 | 8/2012 | Onggosanusi et al. |
| 2012/0219083 A1 | 8/2012 | Tong et al. |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2013/0028068 A1 | 1/2013 | Park et al. |
| 2013/0028344 A1 | 1/2013 | Chen et al. |
| 2013/0039284 A1 | 2/2013 | Marinier et al. |
| 2013/0051256 A1 | 2/2013 | Ong et al. |
| 2013/0107916 A1 | 5/2013 | Liu et al. |
| 2013/0176991 A1* | 7/2013 | Yi .................................. 370/336 |
| 2013/0182786 A1 | 7/2013 | FRENNE et al. |

FOREIGN PATENT DOCUMENTS

| | | | |
|---|---|---|---|
| JP | 2008054125 A | 3/2008 | |
| JP | 2008118411 A | 5/2008 | |
| JP | 2008147792 A | 6/2008 | |
| WO | 2005117283 A2 | 12/2005 | |
| WO | 2007133564 A3 | 11/2007 | |
| WO | 2008009157 A1 | 1/2008 | |
| WO | 2008133582 A2 | 11/2008 | |
| WO | 2010013950 A2 | 2/2010 | |
| WO | WO2011147692 * | 1/2011 | ............. H04J 11/00 |

OTHER PUBLICATIONS

U.S. Appl. No. 13/252,218 Office Action dated Apr. 11, 2013.

ZTE, "Link Analysis of 4Tx Codebook Design for DL SU-MIMO", 3GPP TSG-RAN WG1 #48bis, St. Julians, Malta, Mar. 26-30, 2007.

(56) References Cited

OTHER PUBLICATIONS

Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/023,555, filed Feb. 9, 2011.

Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 12/838,509, filed Jul. 19, 2010.
U.S. Appl. No. 61/294,737, filed Mar. 13, 2010.
U.S. Appl. No. 12/965,878, filed Dec. 12, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
U.S. Appl. No. 12/983,898, filed Jan. 4, 2011.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Way Forward on 8Tx Codebook for Rel.10 DL MIMO", 3GPP TSG Ran WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
U.S. Appl. No. 12/477,152 Official Action dated Jun. 26, 2012.

(56) References Cited

OTHER PUBLICATIONS

U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for REL.10 DL MIMO", 3GPP TSG RAN # 62 Meeting, Madrid, Spain, Aug. 23-27, 2010.
Alcatel -Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec. 7-10, 2010.
Alcatel-Lucent et al., "Way Forward on CSI Feedback for Rel.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737, filed Jan. 10, 2012.
U.S. Appl. No. 13/433,293, filed Mar. 29, 2012.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT DOCOMO, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
3rd Generation Partnership Project; "Technical Specification Group Radio Access Network; Evolved Universal Terrestrial Radio Access (E-UTRA)"; Physical Layer Procedures (Release 8), 3GPP TS 36.213 V8.6.0 (Mar. 2009), Sophia Antipolis, France.

(56) References Cited

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, "Notion of Anchor Carrier in LTE-A", 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
U.S. Appl. No. 12/902,168 Office Action dated Aug. 5, 2013.
U.S. Appl. No. 12/983,898 Office Action dated Sep. 12, 2013.
International Application PCT/IB2013/052963 Search Report dated Sep. 27, 2013.
U.S. Appl. No. 13/766,790 Office Action dated Jul. 22, 2013.
U.S. Appl. No. 12/903,237 Office Action dated Aug. 16, 2013.
U.S. Appl. No. 13/543,835 Office Action dated Nov. 22, 2013.
U.S. Appl. No. 12/965,878 Office Action dated Oct. 24, 2013.
JP Patent Application No. 2011-551560 Office Action dated Oct. 29, 2013.
JP Patent Application No. 2012-506601 Office Action dated Oct. 22, 2013.

\* cited by examiner

SCORING HYPOTHESES IN LTE CELL SEARCH

CROSS-REFERENCE TO RELATED APPLICATIONS

This application claims the benefit of U.S. Provisional Patent Application 61/318,500, filed Mar. 29, 2010, whose disclosure is incorporated herein by reference.

FIELD OF THE DISCLOSURE

The present disclosure relates generally to communication systems, and particularly to methods and systems for identifying base stations in wireless communication systems.

BACKGROUND

In many cellular communication systems, downlink transmissions contain an indication of the transmitting cell, base station or base station group. For example, cell identification signaling in Evolved Universal Terrestrial Radio Access (E-UTRA) systems, also referred to as Long Term Evolution (LTE) systems, is specified by the Third Generation Partnership Project (3GPP), in "Technical Specification Group Radio Access Network; Evolved Universal Terrestrial Radio Access (E-UTRA); Physical Channels and Modulation (Release 8)," TS 36.211, version 8.8.0, September, 2009, section 6.11, which is incorporated herein by reference.

An example process for base station identification, which is carried out by LTE User Equipment (UE) based on such transmissions, is described by Park et al., in "Efficient Coherent Neighbor Cell Search for Synchronous 3GPP LTE System," Electronics Letters, volume 44, no. 21, Oct. 9, 2008, which is incorporated herein by reference.

The description above is presented as a general overview of related art in this field and should not be construed as an admission that any of the information it contains constitutes prior art against the present patent application.

SUMMARY

An embodiment that is described herein provides a method including receiving first and second synchronization sequences that jointly indicate an identity of at least one base station. Multiple hypotheses are selected, each hypothesis associating a respective first candidate sequence with the first synchronization sequence and a respective second candidate sequence with the second synchronization sequence. Each hypothesis is assigned a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match. The at least one base station is identified based on respective composite scores of the hypotheses.

In some embodiments, assigning the composite score to a selected hypothesis includes assigning a first composite score for a first similarity between the qualities of match, and assigning a second composite score, higher than the first composite score, for a second similarity that is higher than the first similarity.

In some embodiments, assigning the composite score to a selected hypothesis includes assigning first and second scores indicative respectively of the first and second qualities of match, calculating a sum of the first and second scores, and correcting the sum based on the similarity. In an embodiment, correcting the sum includes subtracting an absolute value of the difference between the first and second scores from the sum. In a disclosed embodiment, the absolute value of the difference is scaled before subtracting the absolute value from the sum. In an embodiment, calculating the sum includes computing a real value or an absolute value of the sum, and correcting the sum includes correcting the computed real value or absolute value of the sum.

In some embodiments, selecting the hypotheses includes choosing the second candidate sequences for a selected first candidate sequence based on the selected first candidate sequence. In an embodiment, receiving the first and second synchronization sequences includes receiving an Orthogonal Frequency Division Multiplex (OFDM) symbol including multiple subcarriers that are modulated with the first and second synchronization sequences.

In another embodiment, the method further includes taking respective absolute values of the composite scores so as to verify that the composite scores are non-negative. In yet another embodiment, assigning the composite score to each hypothesis includes calculating a first correlation between the first candidate sequence in the hypothesis and the first synchronization sequence, calculating a second correlation between the second candidate sequence in the hypothesis and the second synchronization sequence, and assigning the composite score based on the first and second correlations and on the similarity between the first and second correlations.

There is additionally provided, in accordance with an embodiment that is described herein, an apparatus including a receiver and a processor. The receiver is configured to receive a signal carrying first and second synchronization sequences that jointly indicate an identity of at least one base station. The processor is configured to select multiple hypotheses, each hypothesis associating a respective first candidate sequence with the first synchronization sequence and a respective second candidate sequence with the second synchronization sequence, to assign each hypothesis a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match, and to identify the at least one base station based on respective composite scores of the hypotheses.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
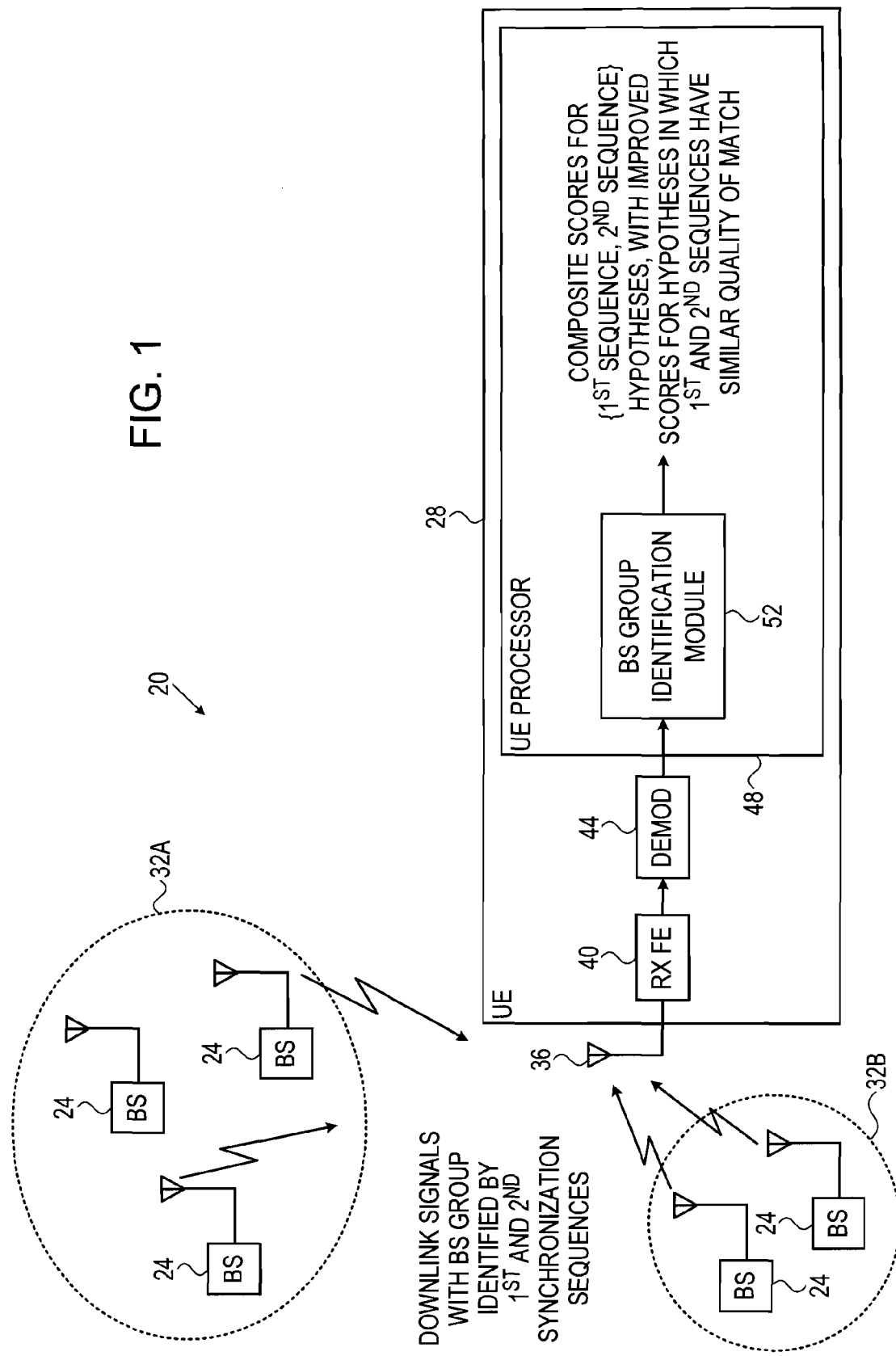
FIG. 1 is a block diagram that schematically illustrates a communication system, in accordance with an embodiment that is described herein.

In some communication systems, such as E-UTRA (LTE) systems, downlink transmissions contain a pair of interleaved synchronization sequences that identify the Base Station (BS) group to which the transmitting BS belongs. Mobile communication terminals (also referred to as User Equipment—UE) decode these synchronization sequences, for example in order to establish a list of cells that the UE is able to receive at a given time. This process is referred to as "neighbor cell search."

Embodiments that are described herein provide improved methods and systems for decoding the above-described synchronization sequences. In some embodiments, upon receiving a downlink transmission, the UE tests multiple hypotheses as potential matches to the received pair of synchronization sequences. Each hypothesis associates the first synchronization sequence with a respective first candidate sequence, and the second synchronization sequence with a respective second candidate sequence. Each hypothesis thus corresponds to a certain BS group identifier that is mapped to the two candidate sequences.

In an embodiment, the UE assigns each hypothesis (i.e., each pair of first and second candidate sequences) a composite score that depends on (i) the quality of match between the first candidate sequence and the first synchronization sequence, (ii) the quality of match between the second candidate sequence and the second synchronization sequence, and (iii) the similarity between the two qualities of match. In an embodiment, the UE assesses the quality of match between a candidate sequence and a synchronization sequence by calculating the correlation between the two sequences. Hypotheses having high scores are considered likely to represent the transmitting BS group, and vice versa. In some embodiments, the UE conducts a neighbor cell search by establishing a list of multiple hypotheses having the highest composite scores.

In the disclosed techniques, the UE assigns higher composite scores to hypotheses in which the qualities of match (e.g., correlations) for both synchronization sequences in the pair are similar. Hypotheses having considerably different qualities of match for the two synchronization sequences are downgraded. This feature overcomes the problem of high false identification probability, which is caused by the fact that the BS group identifier is constructed from a pair of synchronization sequences.

It is possible in principle to assign each hypothesis (each pair of first and second candidate sequences) a composite score that is simply proportional to the two qualities of match. This sort of assignment, however, has a very high likelihood of assigning high scores to false hypotheses, e.g., hypotheses in which one candidate sequence truly matches the respective synchronization sequence but the other candidate sequence is false. When the UE receives transmissions from multiple BSs, some weaker than others, such false hypotheses may achieve composite scores that are comparable with those of true hypotheses. As a result, the neighbor cell search is likely to output false identifications and/or fail to identify true BSs.

In the disclosed techniques, on the other hand, the similarity between the qualities of match of the two candidate sequences is used as a powerful distinguishing factor between true and false hypotheses. Therefore, the disclosed techniques considerably reduce the probability of false BS identification. UEs that use the disclosed techniques are able to identify neighboring BSs with high reliability and few false results.

FIG. 1 is a block diagram that schematically illustrates a communication system 20, in accordance with an embodiment that is described herein. System 20 comprises Base Stations (BS) and mobile communication terminals 28 (also referred to as User Equipment—UE). In the present example, system 20 operates in accordance with the E-UTRA (LTE) specifications, cited above. In alternative embodiments, however, system 20 may comprise an LTE-Advanced (LTE-A) system or any other suitable communication system. Although the example of FIG. 1 shows a single UE 28 for the sake of clarity, real-life systems typically comprise a large number of BSs and UEs.

In some embodiments, BSs 24 in system 20 are divided into groups. The example of FIG. 1 shows two BS groups denoted 32A and 32B. Generally, each BS group may contain any desired number of BSs, or even a single BS. Although in the example of FIG. 1 the BSs in each group are located at different locations, in alternative embodiments the BS in each group are collocated. In one embodiment, for example, each BS group comprises multiple (e.g., three) collocated BSs that cover multiple respective geographical sectors.

The downlink transmissions of each BS comprise signaling information that indicates the identity of the BS and/or the BS group to which the BS belongs. In LTE, for example, downlink transmissions comprise Secondary Synchronization Signals (SSS) that indicate the BS group and Primary Synchronization Signals (PSS) that indicate the individual BS within the group. A unique Physical Cell ID (PCI) is defined as $PCI=3 \cdot SSS_{ID}+PSS_{ID}$.

In LTE systems, the SSS index $SSS_{ID}$ in a given downlink transmission is transmitted using a pair of interleaved 31-bit synchronization sequences that are modulated onto even-order and odd-order Orthogonal Frequency Division Multiplexing (OFDM) subcarriers, respectively. The two synchronization sequences are denoted $SSS_0$ and $SSS_1$, and each pair of these sequences is mapped uniquely to a corresponding $SSS_{ID}$ value. Both sequences are scrambled by the BS. The scrambling scheme of $SSS_1$ depends on the choice of $SSS_0$ in order to prevent false identifications.

In an example application, UE 28 carries out a search process that attempts to detect a set of BSs that the UE is able to receive. This process is sometimes referred to as "neighbor cell search," and is based on decoding of the PSS and SSS sequences. The techniques described herein enable UE 28 to decode the pairs of sequences that encode $SSS_{ID}$, and thus establish the set of neighbor BSs, with high reliability.

In the embodiment of FIG. 1, UE 28 comprises one or more UE antennas 36, and a receiver front end (RX FE) 40 that receives the downlink transmissions from BSs 24. A demodulator 44 demodulates the received downlink signals. Amongst other tasks, demodulator 44 decodes the two synchronization sequences $SSS_0$ and $SSS_1$ that encode $SSS_{ID}$. Typically, demodulator 44 correlates the received signal with various candidate $SSS_0$ and $SSS_1$ synchronization sequences, and outputs the qualities of match between the received pair of synchronization sequences and the respective tested candidate sequences.

A UE processor 48 manages the operation of UE 28 and controls the various UE elements. In some embodiments, processor 48 comprises a BS group identification module 52, which identifies the $SSS_{ID}$ of the BS groups that are received by the UE. Module 52 identifies the BS groups based on the qualities-of-match for the various $SSS_0$ and $SSS_1$ synchronization sequences, as will be explained in detail below.

The configurations of system 20 and UE 28 shown in FIG. 1 are example configurations, which are chosen solely for the sake of conceptual clarity. In alternative embodiments, any other suitable system and/or UE configuration can be used. System and UE elements that are not mandatory for understanding of the disclosed techniques have been omitted from the figure for the sake of clarity. For example, FIG. 1 refers mainly to downlink transmission from BS 24 to UE 28, even though the BS and UE typically conduct bidirectional communication. Thus, UE elements that are related to uplink transmission are not shown in the figure.

The different BS and UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some elements may be implemented using software executing on programmable hardware, or using a combination of hardware and software elements. In some embodiments, some or all of the elements of UE 28 may be fabricated in a chip-set. When implementing some or all of the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In some embodiments, the $SSS_0$ and $SSS_1$ synchronization sequences are transmitted on even-order and odd-order sub-carriers of a given OFDM symbol, respectively. Demodulator 44 attempts to match (e.g., correlate) the signal received over the even-order sub-carriers against various possible candidate $SSS_0$ sequences, and outputs a respective quality of match (e.g., correlation measure) for each candidate $SSS_0$ sequence. Demodulator 44 typically carries out a similar process for the signal received on the odd-order subcarriers, so as to produce a respective quality of match (e.g., correlation measure) for each candidate $SSS_1$ sequence.

It is noted that in some embodiments, the $SSS_1$ synchronization sequence is scrambled using a scrambling sequence that depends on the choice of $SSS_0$ synchronization sequence. In these embodiments, demodulator 44 descrambles the $SSS_0$ synchronization sequence before correlating it with the various $SSS_0$ candidate sequences. In some embodiments the demodulator selects the $SSS_1$ candidate sequences depending on the successful $SSS_0$ candidate sequences.

Based on the $SSS_0$ and $SSS_1$ qualities of match (the quality of match between the $SSS_0$ candidate sequence and the signal received over the even-order sub-carriers, and the quality of match between the $SSS_1$ candidate sequence and the signal received over the odd-order sub-carriers), module 52 in UE processor 48 attempts to identify the $SSS_{ID}$ values, i.e., the pairs of $\{SSS_0, SSS_1\}$ sequences, that were actually received. (In some cases the UE may receive signals from multiple BSs simultaneously.) Although it is possible in principle for module 52 to select the $\{SSS_0, SSS_1\}$ sequences having the highest sum quality of match (i.e., highest sum of $SSS_0$ quality of match and $SSS_1$ quality of match), this scheme is often unreliable and has high likelihood of producing false identifications.

In order to illustrate this effect, let Y denote the received OFDM symbol containing the SSS synchronization sequences, in the frequency domain and after equalization. Demodulator 44 correlates the even-order and odd-order sub-carriers in symbol Y against the various $SSS_0$ and $SSS_1$ candidate sequences, respectively. The correlation between the received symbol Y and a given PCI can be written as the following dot product:

$$R = Y \cdot SSS^*(PCI) \qquad \text{Equation 1:}$$

wherein SSS(PCI) denotes the SSS symbol (combination of $SSS_1$ and $SSS_2$ sequences) corresponding to the given PCI.

In a typical LTE implementation, symbol Y is already conditioned on a certain assumption of $PSS_{ID}$. Therefore, correlation R can take 168 possible values, corresponding to the 168 possible values of $SSS_{ID}$:

$$R(i) = Y \cdot SSS^*(PSS_{ID}, i) \quad i = 0 \ldots 167 \qquad \text{Equation 2:}$$

It is possible in principle to assign each value of $SSS_{ID}$ (i.e., each value of i) a score that is simply proportional to the correlation magnitude across the entire symbol Y, including both the $SSS_0$ and $SSS_1$ synchronization sequences. For example, when the residual time or frequency offsets after equalization are small, the score could take the form of the real part of R:

$$D_c(i) = Re\{Y \cdot SSS^*(PSS_{ID}, i)\} \quad i = 0 \ldots 167 \qquad \text{Equation 3:}$$

When the residual time or frequency offsets cannot be assumed small, the score could take the form of the absolute value of R:

$$D_{nc}(i) = |Y \cdot SSS^*(PSS_{ID}, i)| \quad i = 0 \ldots 167 \qquad \text{Equation 4:}$$

The scores of Equations 3 and 4 are sometimes referred to as coherent and non-coherent scores, respectively.

However, since the SSS symbol Y is made up of a pair of synchronization sequences $SSS_0$ and $SSS_1$, the scores of Equations 3 and 4 may lead to false identifications: Assume that the SSS of a true BS group is mapped at to two synchronization sequence indices denoted $i_1$, $i_2$, wherein $i_1$ denotes the index of the unscrambled sequence. Assume also that the $SSS_0$ and $SSS_1$ sequences that respectively correspond to $i_1$ and $i_2$ are mapped to the even-order and odd-order sub-carriers of the SSS symbol Y, respectively.

Let $Y_{even}$ and $Y_{odd}$ denote the parts of Y that are carried by the even-order and odd-order sub-carriers, respectively. Let $S_1$ and $S_2$ denote the two respective sub-sequences that make-up the SSS symbol. Using this notation, the correlation R can be written as the sum of two partial correlations:

$$R(i) = Y_{even} \cdot SSS_1^*(PSS_{ID}, i_1) + Y_{odd} \cdot SSS_2^*(PSS_{ID}, i_2) = R_{even}(i_1) + R_{odd}(i_2) \qquad \text{Equation 5:}$$

wherein the pair of synchronization sequence indices $(i_1, i_2)$ uniquely defines the $SSS_{ID}$ index i.

There typically exist other $SSS_{ID}$ indices that are mapped to the same even-order sequence $i_1$ as the true BS group, but to a different odd-order sequence $i_2$. Consider, for example, a $SSS_{ID}$ index that is mapped to $(i_1, i_3)$, wherein $i_2 \neq i_3$. Assume that no BS group that the UE can receive truly transmits this $SSS_{ID}$. This false BS group will achieve the same $R_{even}$ value as the true BS group, but a considerably lower $R_{odd}$ value. The total correlation of the false BS group ($R_{even} + R_{odd}$ according to Equation 5) will produce a score that is only 3 dB lower than the score of the true BS group.

Such small differences in correlation between false and true BS groups may lead to false BS group identifications. This problem is especially severe in a neighbor cell search process, in which the task is to identify a list of BSs that can be received without false identifications. Since the true BSs may be received by the UE at varying signal strengths, false identifications may actually be stronger than some true BSs.

In some embodiments that are described herein, module 52 in UE processor 48 reduces the likelihood of false identifications by assigning higher (improved) scores to $(i_1, i_2)$ pairs in which the qualities of match in $i_1$ and $i_2$ are similar to one another. Since the two partial sub-sequences $S_1$ and $S_2$ are interleaved in frequency, any residual estimation error remaining after equalization is likely to be similar (and often identical) in $S_1$ and $S_2$. Therefore, the partial correlations $R_{even}$ and $R_{odd}$ for a true BS group are likely to be similar (and often equal) to one another. Identifications in which partial correlations $R_{even}$ and $R_{odd}$ differ are likely to be false.

In some embodiments, for a given received symbol Y that includes a pair of received synchronization sequences $SSS_0$ and $SSS_1$, module 52 tests multiple hypotheses for potential match to the received pair of synchronization sequences. Each hypothesis associates the received $SSS_0$ synchronization sequence with a respective candidate $SSS_0$ sequence, and the received $SSS_1$ synchronization sequence with a respective candidate $SSS_1$ sequence. Thus, each hypothesis tests a respective BS group identifier $SSS_{ID}$.

Module 52 assigns each hypothesis (i.e., each pair of $SSS_0$ and $SSS_1$ candidate sequences) a composite score that depends on $R_{even}$, on $R_{odd}$ and on the similarity between them. In an example embodiment, module calculates a coherent composite score that is given by:

$$D_c(i_1,i_2)=Re\{R_{even}(i_1)+R_{odd}(i_2)\}-|R_{even}(i_1)-R_{odd}(i_2)| \quad \text{Equation 6:}$$

In an alternative embodiment, module 52 calculates a non-coherent composite score that is given by:

$$D_{nc}(i_1,i_2)=|R_{even}(i_1)+R_{odd}(i_2)|-|R_{even}(i_1)-R_{odd}(i_2)| \quad \text{Equation 7:}$$

At high Signal-to-Noise Ratio (SNR), the following approximations hold for a true BS group:

$$D_c(i_1,i_2)\cong 2Re\{R_{even}(i_1)\} \quad \text{Equation 8:}$$

$$D_{nc}(i_1,i_2)\cong 2|R_{even}(i_1)| \quad \text{Equation 9:}$$

For a false identification, on the other hand, $R_{even}$ is typically similar to that of a true BS group, but $R_{odd}$ typically comprises a correlation with white noise that is negligible at high SNR. For the coherent case at high SNR, it may also be assumed that the imaginary part of $R_{even}$, which originates from noise, is negligible. Therefore, we can rewrite Equation 6 for the false identification as:

$$D_c(i_1,i_2)\cong Im\{R_{even}(i_1)\}+|R_{odd}(i_2)|\cong 0 \quad \text{Equation 10:}$$

In the non-coherent case it can be assumed that $R_{odd}$ is negligible relative to $R_{even}$, and therefore Equation 7 for the false identification can be rewritten as:

$$D_{nc}(i_1,i_2)\cong |R_{even}(i_1)|-|R_{even}(i_1)|\cong 0 \quad \text{Equation 11:}$$

Thus, the disclosed technique ensures that false identifications (false BS groups) are assigned composite scores that are considerably lower than those assigned to true BS groups, even for weak BSs.

In an alternative embodiment, the composite scores in the non-coherent case are given by:

$$\tilde{D}nc(i_1,i_2)=|D_{nc}(i_1,i_2)| \quad \text{Equation 12:}$$

This modification to Equation 7 above is useful, for example, to obtain consistently non-negative composite scores. Negative composite scores could occur, for example, if the second term in Equation 7 were to exceed the first term due to noise.

In another alternative embodiment, the composite scores in the coherent and non-coherent case are given respectively by:

$$D_c(i_1,i_2)=Re\{R_{even}(i_1)+R_{odd}(i_2)\}-\alpha|R_{even}(i_1)-R_{odd}(i_2)| \quad \text{Equation 13:}$$

$$D_{nc}(i_1,i_2)=|R_{even}(i_1)+R_{odd}(i_2)|-\alpha|R_{even}(i_1)-R_{odd}(i_2)| \quad \text{Equation 14:}$$

wherein $0<\alpha<1$. In other words, the absolute value term, which is indicative of the similarity between $R_{even}$ and $R_{odd}$, is scaled by $\alpha$ before it is subtracted from the sum of $R_{even}$ and $R_{odd}$.

Figure 2:
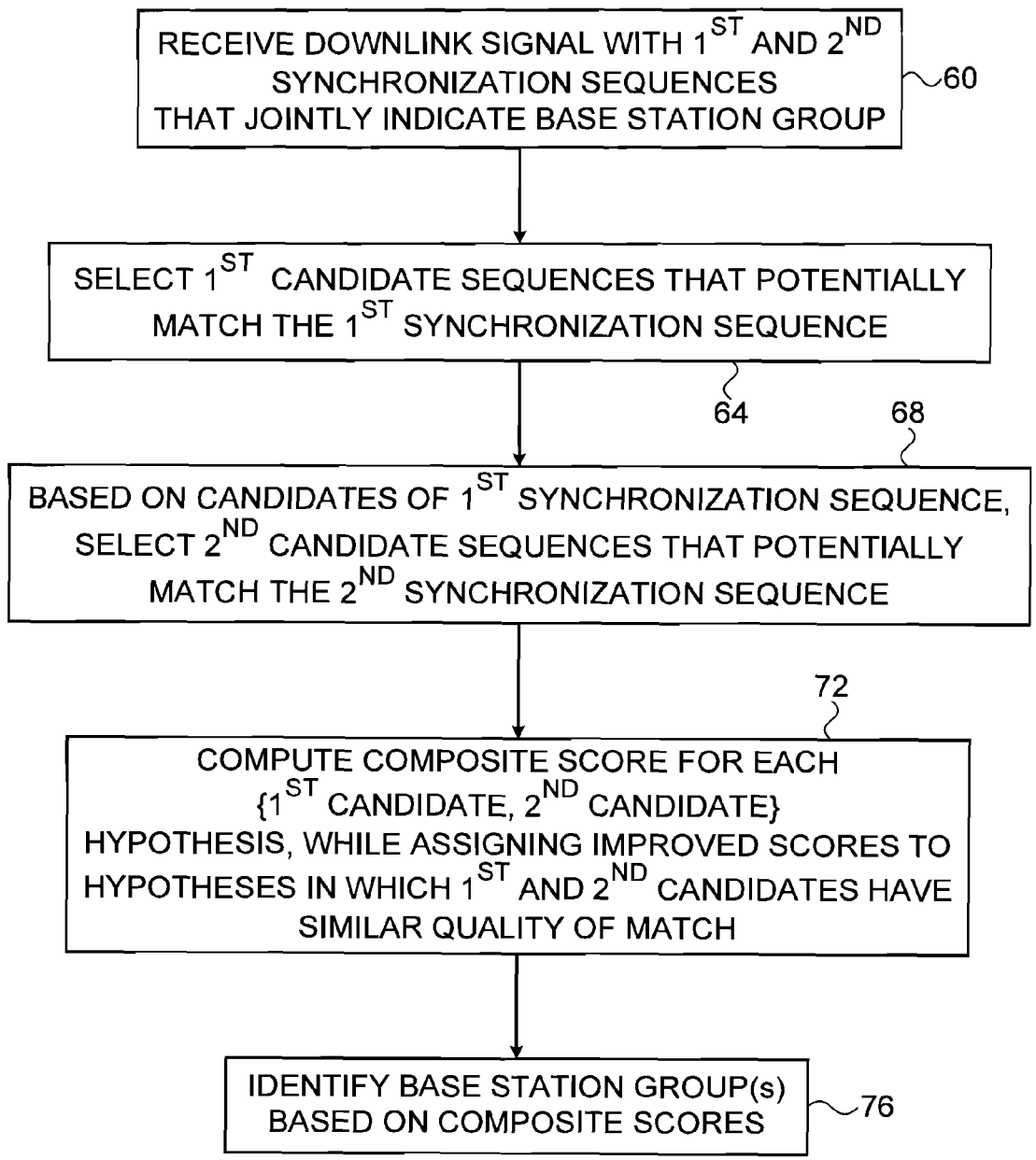
FIG. 2 is a flow chart that schematically illustrates a method for cell identification, in accordance with an embodiment that is described herein.

FIG. 2 is a flow chart that schematically illustrates a method for cell identification, in accordance with an embodiment that is described herein. The method begins at a reception operation 60, with RX FE 40 and demodulator 44 of UE 28 receiving downlink transmissions from one or more BSs 24. The downlink transmission of each BS comprises a pair of first and second synchronization sequences that jointly indicate the BS group to which the BS belongs.

Module 52 in UE 28 selects first candidate sequences that potentially match the first synchronization sequence in the pair, at a first candidate selection operation 64. Based on the first candidate sequences, module 52 selects second candidate sequences that potentially match the second synchronization sequence in the pair, at a second candidate selection operation 64.

Module 52 computes a composite score for each hypothesis (i.e., for each {first candidate sequence, second candidate sequence} pair), at a score calculation operation 72. As explained above, the score assignment scheme assigns higher composite scores to hypotheses in which the first and second candidate sequences have similar qualities-of-match with the respective synchronization sequences.

Module 52 then identifies the BS group or groups indicated by the received signals based on the composite scores, at an identification operation 76. In an embodiment, module 52 establishes a list of the hypotheses having the highest composite scores. Each hypothesis on this list is considered a BS group that the UE is able to receive.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
receiving first and second synchronization sequences that jointly indicate an identity of at least one base station;
selecting multiple hypotheses, each hypothesis associating a respective first candidate sequence with the first synchronization sequence and a respective second candidate sequence with the second synchronization sequence;
assigning each hypothesis a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match, wherein assigning the composite score to a selected hypothesis comprises assigning first and second scores indicative respectively of the first and second qualities of match, calculating a sum of the first and second scores, and correcting the sum based on the similarity; and
identifying the at least one base station based on the respective composite scores of the hypotheses.

2. The method according to claim 1, wherein correcting the sum comprises subtracting an absolute value of the difference between the first and second scores from the sum.

3. The method according to claim 2, comprising scaling the absolute value of the difference before subtracting the absolute value from the sum.

4. The method according to claim 1, wherein calculating the sum comprises computing a real value or an absolute value of the sum, and wherein correcting the sum comprises correcting the computed real value or absolute value of the sum.

5. The method according to claim 1, wherein selecting the hypotheses comprises choosing the second candidate sequences for a selected first candidate sequence based on the selected first candidate sequence.

6. The method according to claim 1, wherein receiving the first and second synchronization sequences comprises receiving an Orthogonal Frequency Division Multiplex (OFDM) symbol comprising multiple subcarriers that are modulated with the first and second synchronization sequences.

7. The method according to claim 1, comprising taking respective absolute values of the composite scores so as to verify that the composite scores are non-negative.

8. The method according to claim 1, wherein assigning the composite score to each hypothesis comprises calculating a first correlation between the first candidate sequence in the hypothesis and the first synchronization sequence, calculating a second correlation between the second candidate sequence in the hypothesis and the second synchronization sequence, and assigning the composite score based on the first and second correlations and on the similarity between the first and second correlations.

9. A method, comprising:
receiving first and second synchronization sequences that jointly indicate an identity of at least one base station;
selecting multiple hypotheses, each hypothesis associating a respective first candidate sequence with the first synchronization sequence and a respective second candidate sequence with the second synchronization sequence;
assigning each hypothesis a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match; and
identifying the at least one base station based on the respective composite scores of the hypotheses,
wherein assigning the composite score to a selected hypothesis comprises assigning a first composite score for a first similarity between the qualities of match, and assigning a second composite score, higher than the first composite score, for a second similarity that is higher than the first similarity.

10. Apparatus, comprising:
a receiver, which is configured to receive a signal carrying first and second synchronization sequences that jointly indicate an identity of at least one base station; and
a processor, which is configured to select multiple hypotheses, each hypothesis associating a respective first candidate sequence with the first synchronization sequence and a respective second candidate sequence with the second synchronization sequence, to assign each hypothesis a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match, and to identify the at least one base station based on the respective composite scores of the hypotheses,
wherein the processor is configured to assign the composite score to a selected hypothesis by assigning first and second scores indicative respectively of the first and second qualities of match, calculating a sum of the first and second scores, and correcting the sum based on the similarity.

11. The apparatus according to claim 10, wherein the processor is configured to correct the sum by subtracting an absolute value of the difference between the first and second scores from the sum.

12. The apparatus according to claim 10, wherein the processor is configured to compute a real value or an absolute value of the sum, and to correct the computed real value or absolute value of the sum based on the similarity.

13. The apparatus according to claim 10, wherein the processor is configured to choose the second candidate sequences for a selected first candidate sequence based on the selected first candidate sequence.

14. The apparatus according to claim 10, wherein the receiver is configured to receive an Orthogonal Frequency Division Multiplex (OFDM) symbol comprising multiple subcarriers that are modulated with the first and second synchronization sequences.

15. The apparatus according to claim 10, wherein the processor is configured to take respective absolute values of the composite scores so as to verify that the composite scores are non-negative.

16. A mobile communication terminal comprising the apparatus of claim 10.

17. A chipset for processing signals in a mobile communication terminal, comprising the apparatus of claim 10.

18. Apparatus, comprising:
a receiver, which is configured to receive a signal carrying first and second synchronization sequences that jointly indicate an identity of at least one base station; and
a processor, which is configured to select multiple hypotheses, each hypothesis associating a respective first candidate sequence with the first synchronization sequence and a respective second candidate sequence with the second synchronization sequence, to assign each hypothesis a respective composite score depending on a respective first quality of match between the first candidate sequence in the hypothesis and the first synchronization sequence, on a respective second quality of match between the second candidate sequence in the hypothesis and the second synchronization sequence, and on a similarity between the respective first and second qualities of match, by assigning to a selected hypothesis a first composite score for a first similarity between the qualities of match, and assigning to the selected hypothesis a second composite score, higher than the first composite score, for a second similarity that is higher than the first similarity, and to identify the at least one base station based on the respective composite scores of the hypotheses.

* * * * *